Sept. 13, 1960  W. A. WILLIAMS  2,952,161
MOTION CONTROL SHEAVE WITH LIFETIME LUBRICATION
Filed Nov. 7, 1956  6 Sheets-Sheet 1
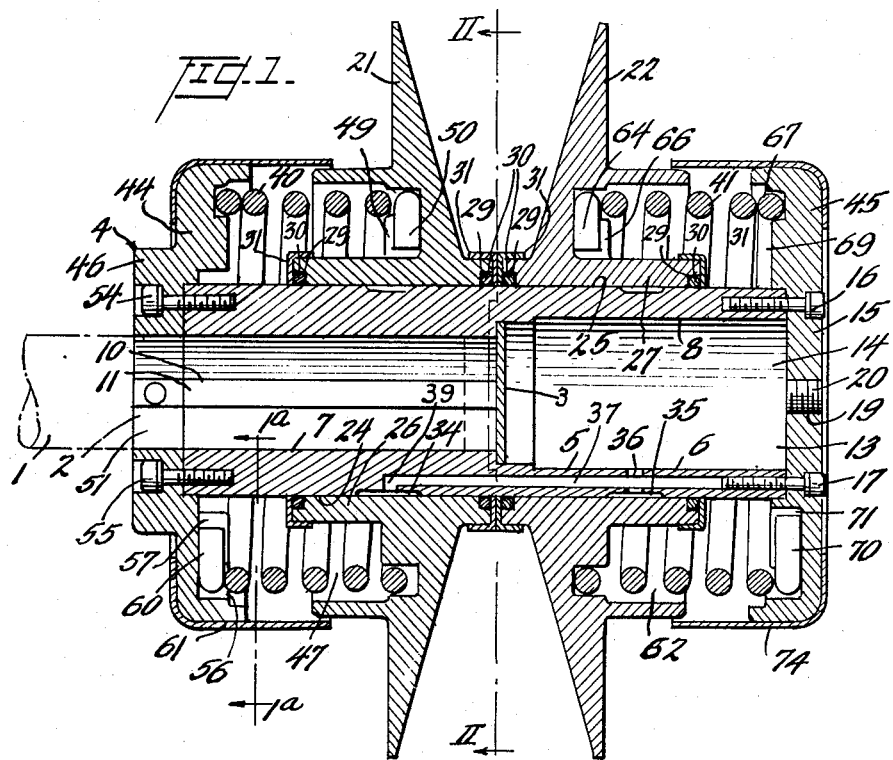
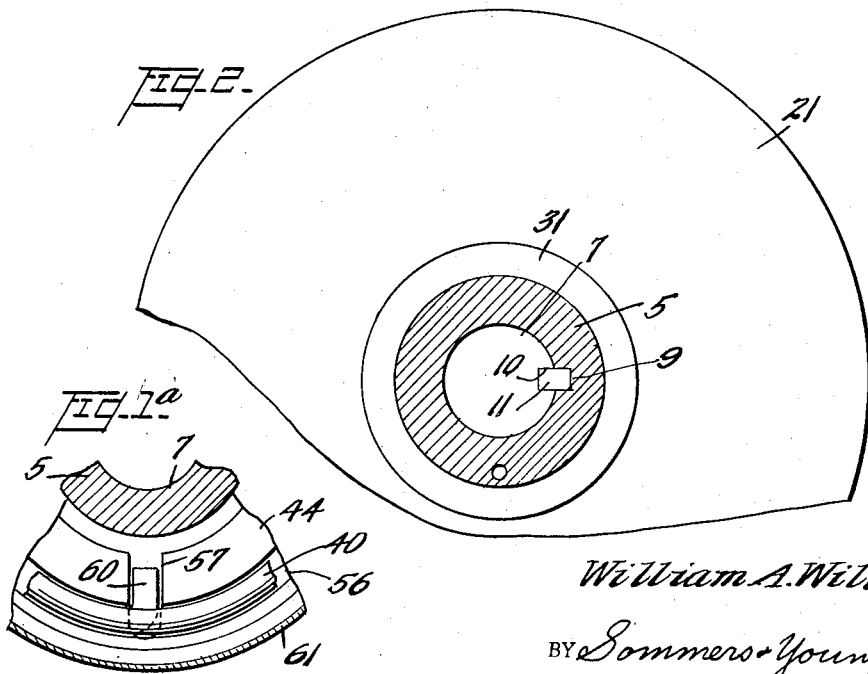
INVENTOR
William A. Williams,
BY Sommers + Young
ATTORNEYS

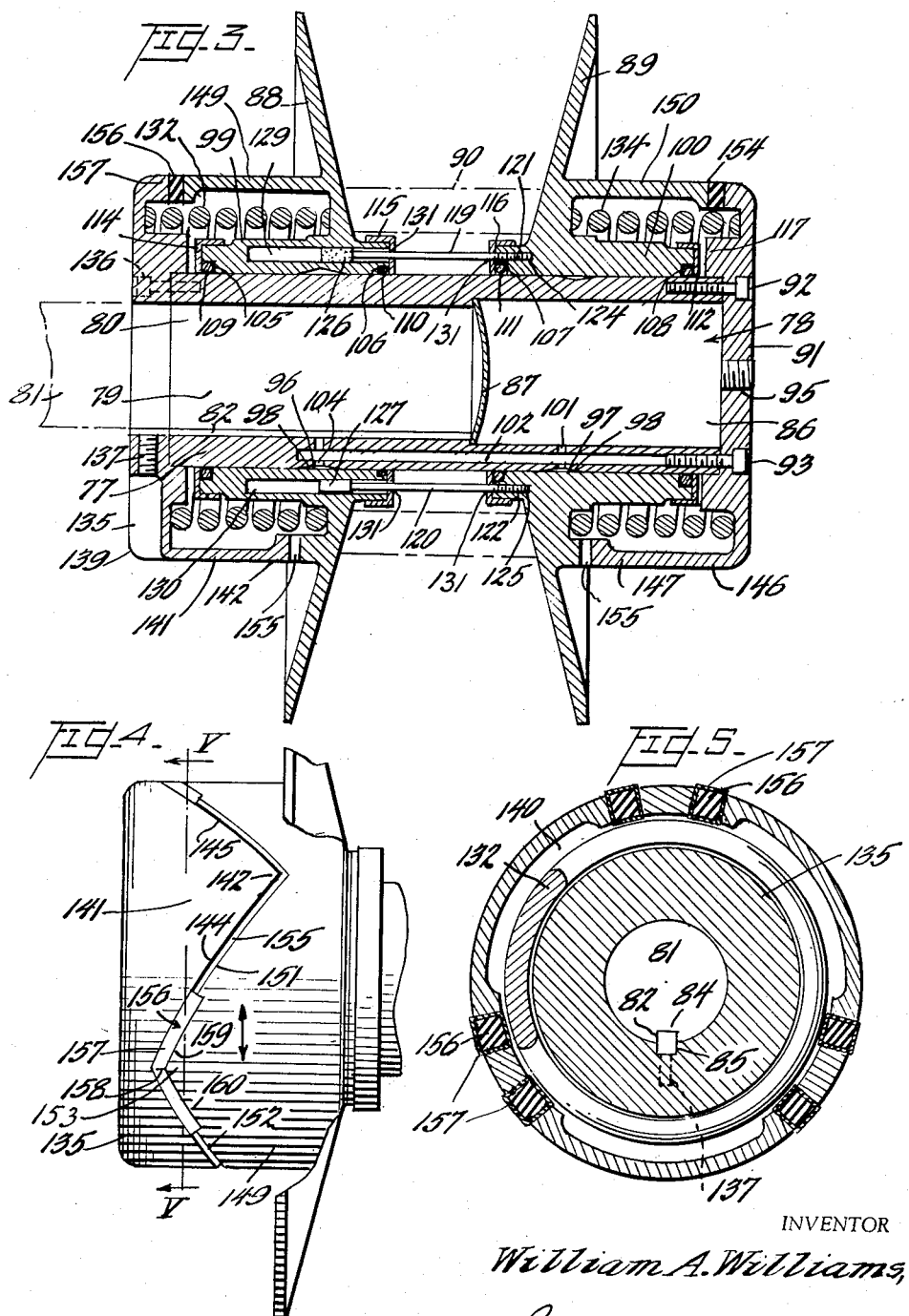

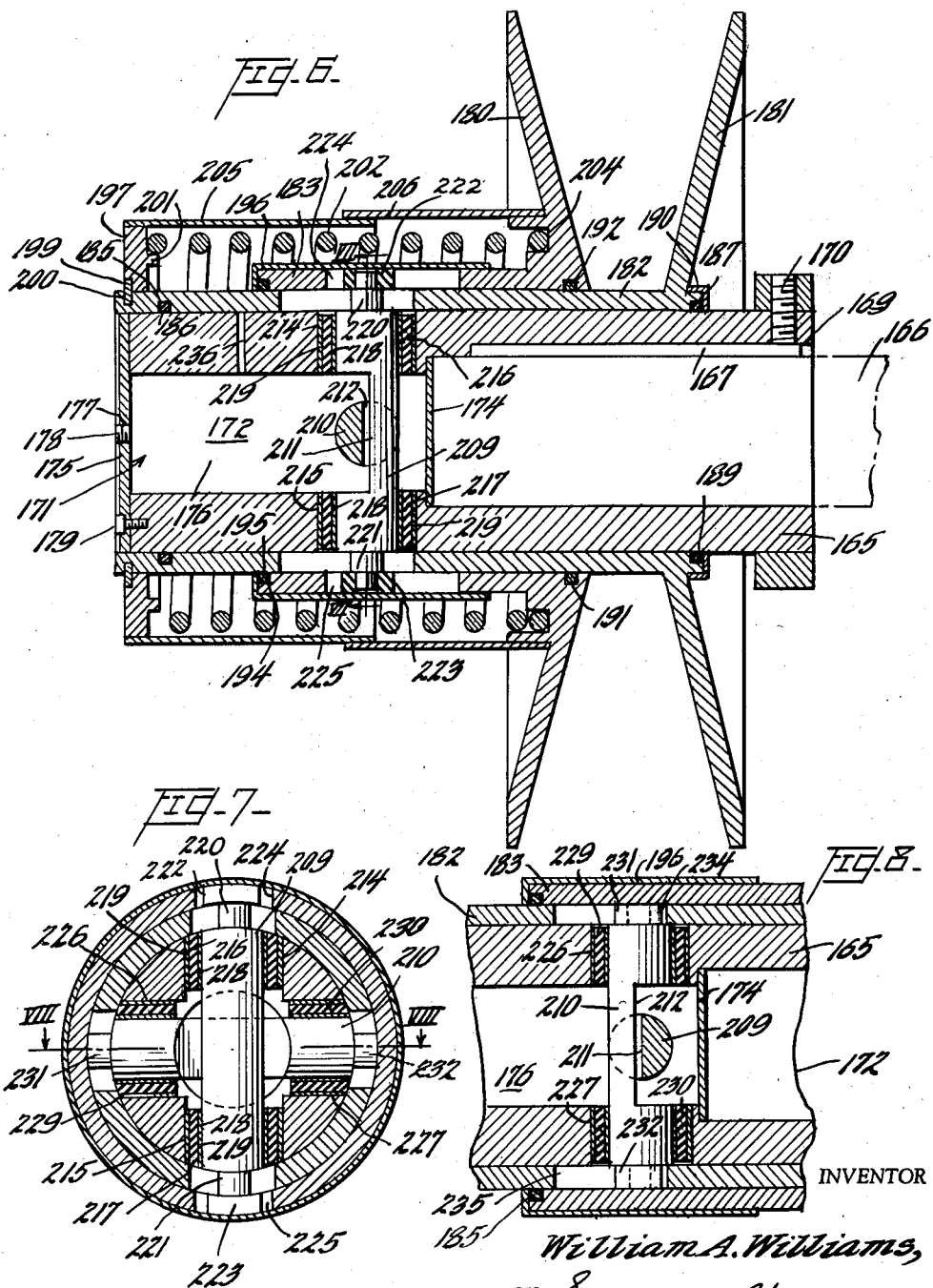

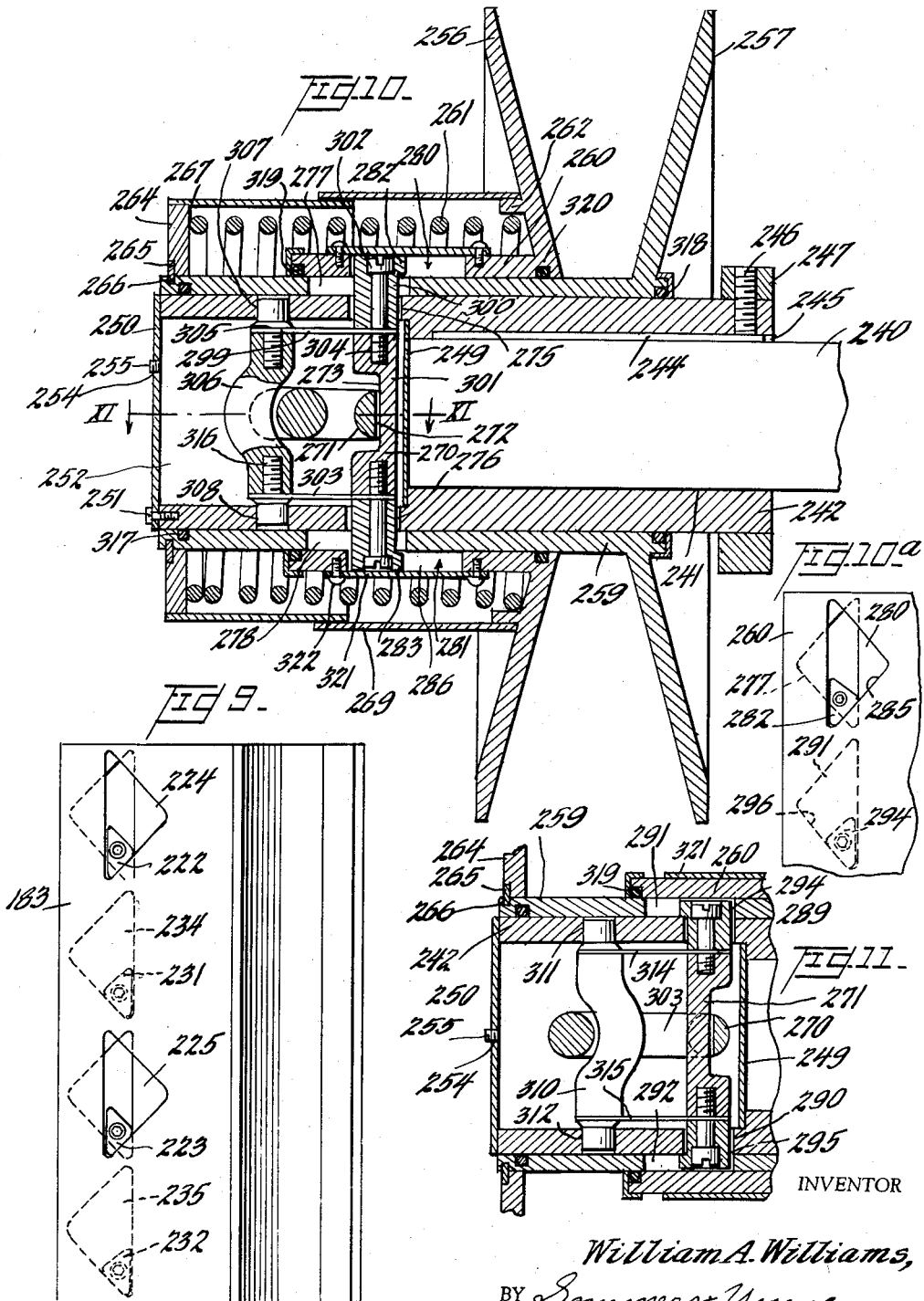

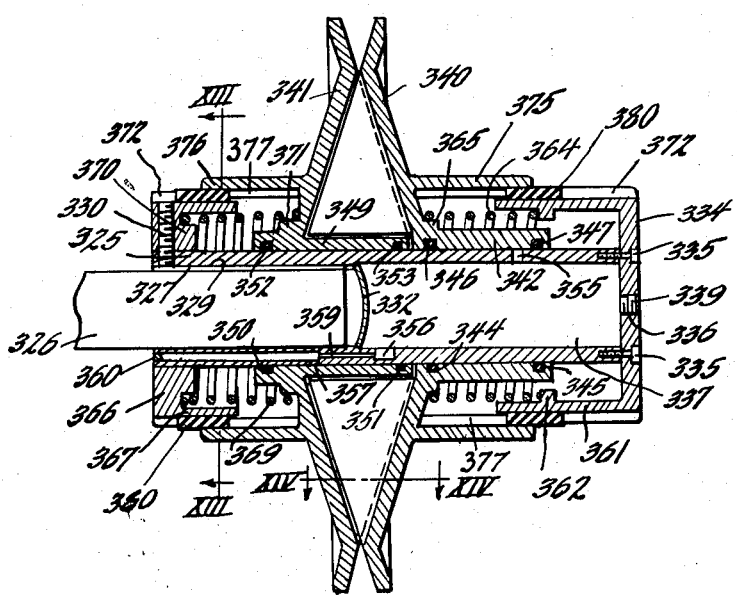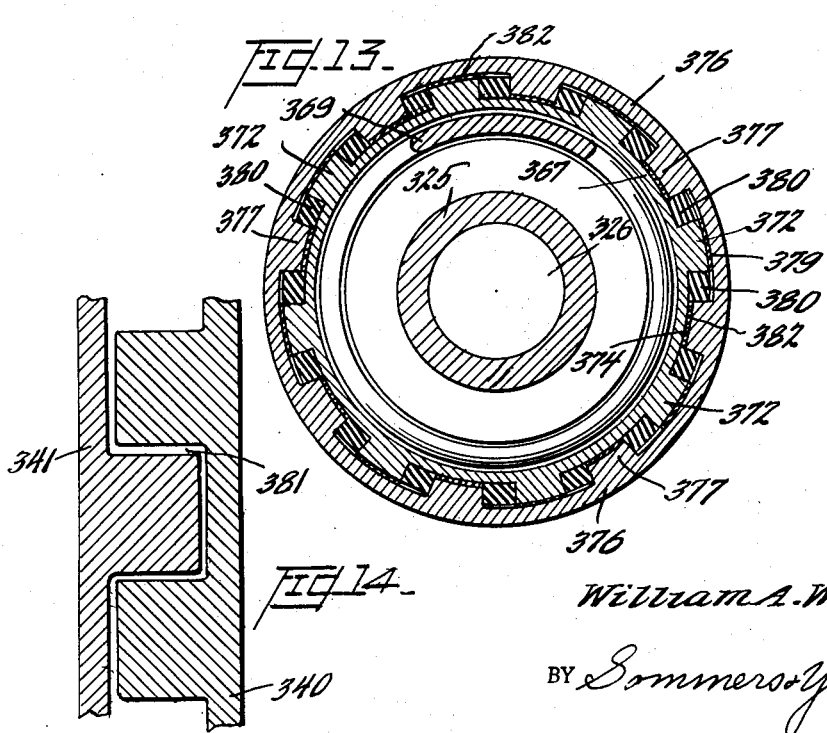

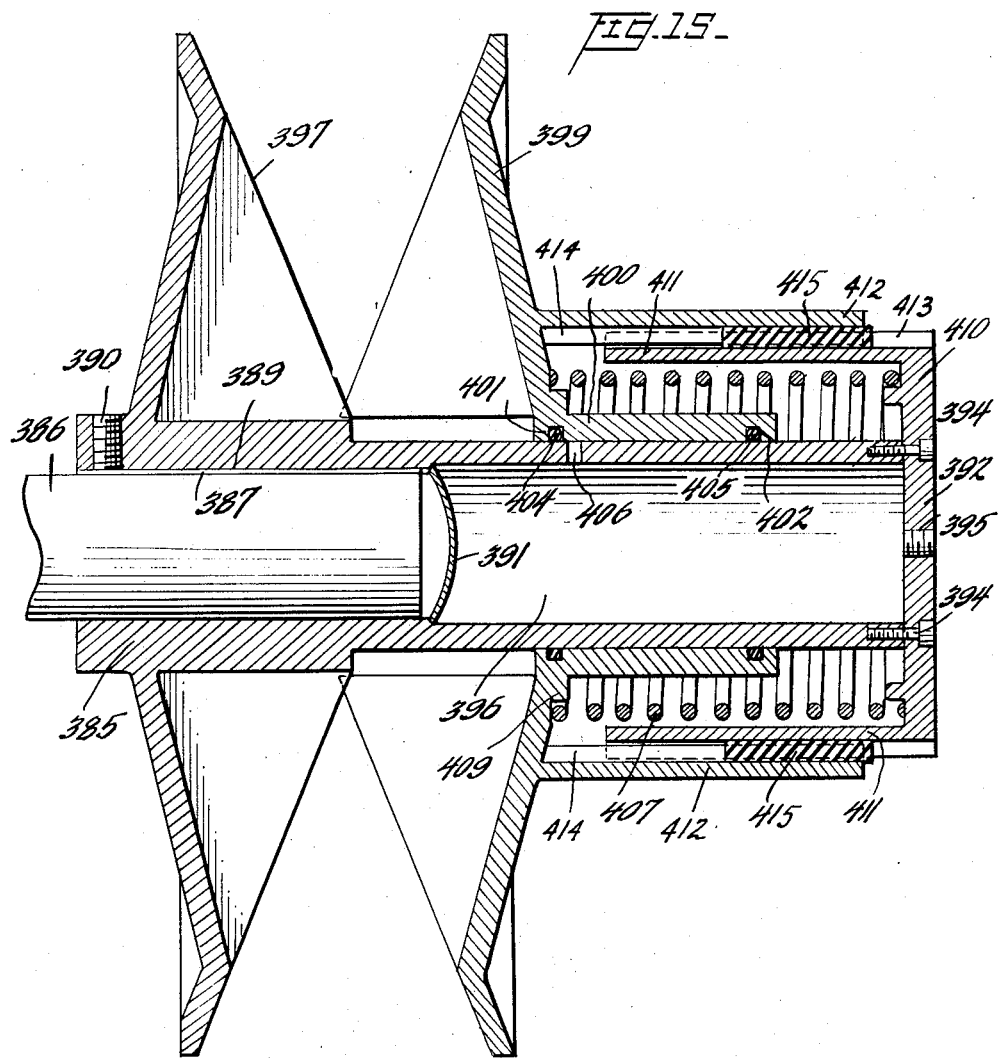

United States Patent Office 2,952,161
Patented Sept. 13, 1960

2,952,161

MOTION CONTROL SHEAVE WITH LIFETIME LUBRICATION

William A. Williams, Philadelphia, Pa., assignor to T. B. Wood's Sons Company, a corporation of Pennsylvania Filed Nov. 7, 1956, Ser. No. 620,949

18 Claims. (Cl. 74—230.17)

This invention relates to lifetime lubricated motion control sheaves and has for an object to provide a sheave of the V-type in which one or both flanges are movable laterally to effect changes of pitch.

A further object of this invention is to provide a sheave of this type in which the contacting movable surfaces are lubricated for life and the lubricant is sealed in contact with the movable surfaces.

A further object of this invention is to so construct the sheave and the sleeve that pressure is never continuously applied to any one area between the mating surfaces, but is rather at all points relieved by separation once each revolution of the sheave so as to admit a new film of lubricant.

A further object of this invention is to provide a sheave of the motion control type in which excessive side wall pressure of the conical flanges of the sheave against the belt is avoided by the provision of cam surfaces which increase belt side wall pressure with increase in torque; the cam followers being rubber pads which insure approximately equal division of load among the two or more cam lobes; the rubber pad further insuring the necessary radial freedom of movement needed to provide the separation between hub and sleeve at each point once each revolution, and this without wear between the cam surfaces.

A further object of this invention is to provide for elastic contact of the cams so as to compensate for minor errors in the manufacture of the cams and to permit a low cost construction, which errors if not compensated for could cause one cam to carry the entire torque and axial pressure load, thus binding the flange hub and sleeve in more or less permanent contact at one point which would prevent relubrication of the contacting surfaces of the respective parts.

A further object of this invention is to provide an ample oil reservoir that is sealed tightly against loss of oil or the admission of contaminants, and which connects to the contacting surfaces between hub and sleeve, positive provision also being made to prevent loss of lubricant from the space between flange hubs and the sleeve.

Several embodiments of sheaves exemplifying one or more of the foregoing features are shown by way of example in the accompanying drawings, and other objects and advantages will become apparent from inspection of the said drawings and of the description thereof which follows:

In the drawings

Fig. 1 is a longitudinal sectional view of a motion control sheave in which both flanges of the sheave are driven from the drive shaft through coiled springs and both flanges are adapted to move laterally small amounts under change of drive, the flange hubs being provided with a special lubrication system adapted to lubricate for the life of the sheave.

Fig. 1a is a cross sectional view on section line Ia—Ia.

Fig. 2 is a transverse section of the sheave of Fig. 1 taken on section line II—II of Fig. 1.

Fig. 3 is a longitudinal sectional view of a modified embodiment of the motion control sheave according to this invention in which cam means is provided for limiting the relative angular movement between the sheave flanges and the shaft and also limiting the separation of the flanges from each other.

Fig. 4 is a side view of an end portion of the sheave of Fig. 3, partly broken away and partly omitted for clarity of disclosure.

Fig. 5 is a cross-sectional view on the section line V—V of Fig. 4.

Fig. 6 is a longitudinal axial sectional view of a third embodiment of the invention, according to which the relative rotation between the sheave flanges and the shaft is limited by a pair of cross pins mounted in elastic material and having their ends cooperating with cams on the respective sheave flange hubs.

Fig. 7 is a transverse cross-sectional view of a detail of Fig. 6 on section line VII—VII.

Fig. 8 is a horizontal cross-sectional view section on line VIII—VIII of Fig. 7.

Fig. 9 is a developed view of the end portions of the hubs and mounting sleeve of Fig. 8.

Fig. 10 is a longitudinal cross-sectional view of a fourth embodiment of the invention according to which sets of relatively thin shims or leaf springs employed for providing the resilience necessary for allowing some angular motion between the shaft and the sheave flanges but limiting the said movement to prevent too great spacing of the flanges until higher load.

Figure 10a is reduced scale developed view of a portion of the hubs of the sheave flanges illustrating the relationship of shoe members and inclined surfaces.

Fig. 11 is a cross-sectional view of the left end portions of the hubs of the flanges and the mounting sleeve taken on section line XI—XI of Fig. 10 at right angles to the section plane of Fig. 10.

Figure 12 is a longitudinal sectional view of a fifth embodiment of the invention in which the flanges of the sheave are limited in turning relative to the shaft by blocks of elastic material.

Fig. 13 is a cross-sectional view on section line XIII—XIII.

Fig. 14 is a cross-sectional view taken on section line XIV—XIV of Fig. 12.

Fig. 15 is a longitudinal sectional view of a modified embodiment in which one of the flanges is formed on the sleeve, and the other flange is movably mounted thereon.

In Figure 1 of the drawings reference numeral 1 designates a shaft which may be the shaft of a motor (not shown). On the stub end portion 2 of the shaft 1 is mounted a variable speed motion control sheave designated generally by numeral 4.

The motion control sheave 4 is comprised by a sleeve 5, provided with a longitudinal through-extending bore 6, one end portion 7 of which is of approximately the same diameter as the shaft 1 and is adapted to be mounted on shaft 1 with the end portion 2 of the shaft in said end portion 7 of said bore.

The end portion 8 of bore 6, which is separated from end portion 7 by diaphragm 3, serves as a reservoir 13 for a supply of fluid lubricant 14, and the right hand end of the bore is tightly sealed by an end plate 15, connected to the sleeve by cap screws 16, 17. End plate 15 is provided with a screw-threaded bore 19, through which the lubricant is initially introduced, and bore 19 is closed by a pipe plug 20.

The outer surface of sleeve 5 is preferably, precisely, and smoothly finished in cylindrical shape and has mounted thereon a pair of conical sheave flanges 21 and 22 the conical surfaces of which face each other and form therebetween an annular V-shaped groove for accommodating a V-belt. The inner surfaces, respectively, 24, 25 of the hubs 26 and 27 are also preferably, precisely and smoothly finished to closely fit the sleeve but with sufficient play to freely slide thereon both axially and angularly.

Both of the inner edges of both flanges are provided with small annularly extending recesses 29 and in each recess a sealing ring 30 is seated and each is held in place by an O-ring retaining cap 31.

For supplying lubricant 14 from reservoir 13, sleeve 5 is provided with a set of channels or conduits extending from the reservoir 13 to each of two annular recesses 34, 35, formed in the outer surface of said sleeve, the said recesses 34 and 35 being spaced apart longitudinally and each being located at a position between the two sealing rings 30 of each hub 26 and 27. The aforesaid set of channels or conduits for supplying the lubricant from reservoir 13 to recesses 34 and 35, are represented as comprising a radially extending bore 36 in sleeve 5 at a point opposite recess 35, a longitudinally extending bore 37 connecting with bore 36 and a radially extending bore 39 connecting bore 37 with recess 34. The outer end of bore 37 is closed as by cap screw 17. It will be understood from the foregoing that the flange hubs 26 and 27 are mounted on sleeve 5 for free movement and are permanently lubricated from the lubricant in reservoir 13 which tends to flow to the hubs under the influence of centrifugal force through conduits 36, 37 and 39 and also that the lubricant thus supplied is prevented from leaking from beneath the flange hubs by seals 30.

In order for the sheave to drive or be driven it is required that the flanges 21 and 22 be supported against sliding away from each other, and also drivingly connected with sleeve 5, and for this purpose each of said flanges is provided with a helical spring 40 and 41, respectively, which extend between said flanges, and extensions 44, 45, of end plates 46 and 15, respectively. For accommodating the adjacent end portion of spring 40 the hub portion 26 of flange 21 is provided with an annular recess 47 in its side, and within recess 47 an inwardly directed socket 49 is provided into which the inturned end portion 50 of spring 40 extends and is retained.

End plate 46 is provided with a central opening 51 through which shaft 1 extends into the sleeve portion 7, and plate 46 is secured to sleeve 5 by cap screws 54, 55. End plate 46 is provided on its inner surface with an annular recess 56 into which the left hand end, as viewed in Fig. 1, of spring 40 extends, and within said recess the plate is provided with an inwardly extending socket 57 into which the inturned end portion 60 of spring 40 extends so as to secure said spring to plate 46. The space between the hub portion 26 and plate portion 44, in which spring 40 is located, is covered by a cup-shaped cover 61 which fits tightly on plate portion 44 and slidably against hub portion 26.

The accommodation and securement of spring 41 between hub portion 27 and end plate 15 resembles that just described in connection with spring 40. Hub portion 27 is provided with an annular recess 62 into which the adjacent end portion of spring 41 extends and the inwardly turned end portion 64 of spring 41 is accommodated in socket 66. The opposite end portion 67 of spring 41 extends into annular recess 69 in extension 45 of plate 15, and the inwardly turned end portion 70 of spring 41 engages inwardly extending socket 71 formed in cap extension 45 in recess 69. For closing the space between cap extension 45 and hub 27 a cup-shaped cover 74 is provided which fits tightly on extension 45 and loosely on hub 27 so as to allow movement therebetween.

Under all driving conditions the drive between shaft 1 and the sheave flanges is transmitted through resilient springs 40, and 41, and, thus, all of the drive is resiliently transmitted without any mechanical drive surfaces arranged radially which could be subject to wear.

No appreciable wear can occur between the outer surface of sleeve 5 and the inner surfaces of hubs 26 and 27 because these surfaces are continuously separated by a thin coating of lubricant. Due to the continuous movement or precession of the zones of contact between the sleeve and hubs caused by the pull exerted by the belt, the sleeve and hubs will continuously be separated slightly at zones opposite to said zones of contact and this separation serves to replenish the oil film between the sleeve and hubs. As previously mentioned the provision of seals between the hubs and sleeve prevents loss of lubricant and the mass of lubricant provided initially in the reservoir is sufficient to last the lifetime of the sheave. It is to be noted that according to the embodiment of the invention just described and also according to each of the other embodiments the transmission of force between the sheave and the shaft is by substantially pure torque. By the term "pure torque" is meant a pure couple, in which any force acting on the body is exactly balanced by an equal and opposite force, so that the object has no tendency to move in any direction, but does tend to rotate. According to this invention the said transmission of force need not be performed by absolutely pure torque but only sufficient to cause the clearance to open and close at each point on the hub each revolution.

The embodiment of the invention represented in Figs. 3, 4 and 5 of the drawings is intended to provide all of the advantages of the lifetime lubrication and non-wearing construction of the embodiment represented by Figs. 1 and 2 and also elastic cam means for restraining the sheave flanges from moving so far apart under heavy load as to cause an excessive reduction in speed. This results in lower average side wall pressure against the belt, thus preventing excessive wear. Also in this embodiment means is provided for ensuring that the sheave flanges shall remain at approximately the same relative angular relationship to each other which has the further result that the two flanges will remain at approximately the same relationship relative to the line or plane of drive.

In Figs. 3, 4 and 5 reference numeral 77 designates a sleeve having a central longitudinal bore 78, one end portion 79 of which is of a proper diameter to accommodate the stub end portion 80 of a drive or driven shaft 81. The sleeve and shaft are locked against relative rotation by a key 82 and keyways 84, 85. The other end portion 86 of bore 78 is separated from portion 79 by a tightly sealing diaphragm 87. The outer surface of sleeve 77 is precisely and smoothly finished and serves for mounting a pair of sheave flanges 88, 89 having their convex faces toward each other so as to form therebetween a V-shaped groove for accommodating a V-belt represented diagrammatically in dotted lines and designated 90.

The end of sleeve 77 opposite the shaft 81 is closed by an end plate 91, secured to said end of the sleeve by cap screws 92, 93. End plate 91 is provided with a screw threaded opening 95, through which fluid lubricant can be inserted into the reservoir formed therein between diaphragm 87 and plate 91. A pipe plug 94 closes opening 95. The lubricant reservoir is connected with the outer surface of the sleeve at two points, 96 and 97, one beneath each of the hub portions 99 and 100, respectively, by a set of interconnected bores comprising radial bore 101, longitudinal bore 102, and radial bore 104. At each of the positions where the radial bores 101 and 104 open to the outside of sleeve 77, the sleeve is provided with an annular depression serving as a distributing channel 98 for the lubricant supplied thereto. The outer end of bore 102 is closed by cap screw 93. For retaining the lubricant between the hub portions 99 and 100, each of these portions is provided at each of its end edges with an annular recess 105, 106, 107 and 108, in which are accommodated sealing rings 109, 110, 111 and 112, each held in place in said recesses by O-ring retaining caps 114, 115, 116, 117 respectively.

In order to ensure that the angular positions of the two sheave flanges shall not be altered to any considerable extent they are connected by a set of rods two of which are represented in the drawings as rods 119 and 120. One end of each of these rods is screw-threaded as indicated at 121 and 122 and these ends engage in screw-threaded bores 124, 125 respectively in the hub portion 100, of flange 89. These rods pass through openings 131—131 in retaining cap 116. The opposite end portions of rods 119, and 120 are provided with bushings 126, 127 of nylon or nylon covered rubber, and these end portions and bushings are slidably accommodated in smooth bores 129, 130, respectively in the hub portion 99 of flange 88. The retaining cap 115 is also provided with openings 131, 131 for passage of rods 119, 120, respectively. The elasticity of the bushings 126, 127 allows small swinging and flexing movements of the rods 119, 120 and, thus, small relative angular movements of the two flanges 88, 89, but resists any very large relative angular movements.

For exerting axial pressure on the sheave flanges toward each other and toward the cooperating V-belt, a pair of helical springs 132, 134 are provided. At the left hand end of sleeve 77 an end plate 135 is mounted and secured thereto by cap screws one of which is indicated in dotted lines at 136. This end plate is provided with a central axial opening for passage of shaft 81, and it also has a radial screw-threaded bore for accommodating set screw 137 which locks key 82 against movement in keyways 84 and 85. End plate 135 is provided with a radially extending outer portion 139 which is provided with an annular recess 140 into which extends the left hand end portion of spring 132.

At its outer edge portion 139 end plate 136 is provided with a crown-shaped flange 141 extending toward the sheave flange 88, and this flange 141 is provided with three points, one of which is designated 142 in Fig. 4. These points 142 have inclined edges and each provides on its edges a pair of cam surfaces 144 and 145, one facing in each direction of possible rotation of the sheave.

End plate 91, at the opposite end of sleeve 77 from end plate 135 is also provided, at its outer edge, with an annular crown-shaped flange 146 extending toward sheave flange 89. This flange 146 is also provided with a set of three points similar to that described in connection with flange 141, one of which points is designated by numeral 147 in Fig. 3.

Each of the sheave flanges 88 and 89 is provided with an annular axially extending crown-shaped flange designated 149 and 150, respectively. These flanges 149 and 150 extend outside of springs 132 and 134, respectively, and are provided with points having inclined edges which provide two cam surfaces 151 and 152, on each point facing in opposite directions of possible rotation of the sheave. One of the said points of flange 149 is designated 153 in Fig. 4, and a point of flange 150 is designated 154 in Fig. 3.

The points 153 and 154 of flanges 149 and 150 are located angularly intermediate points 142 and 147 of flanges 141 and 146 respectively, and the cam surfaces facing each other are spaced apart slightly as indicated by way of example by 155 in Figs. 3 and 4. In each of the spaces 155 between each pair of facing cams is located a body or pad 156 of elastic material, for instance, rubber, preferably covered with a strong fabric 157 of low frictional resistance, for instance, cotton or nylon. These pads may be notched at their centers 158 on one side to facilitate their bending and turning the corner around one of the points, say, point 153, and the cam surfaces 151 and 152 adjacent the end of point 153 may be provided with recesses 159, 160 for accommodating part of the pads to provide a secure lodgment, and the pads may be cemented or vulcanized in said recesses.

The motion control sheave according to the embodiment represented by Figs. 3, 4 and 5 is especially designed and adapted to operate at substantially constant speed regardless of variations of load. It will be apparent that under increased load and belt tension the sheave flanges will tend to move apart under the wedging influence of belt 90. This tendency to separate would be opposed somewhat by springs 132 and 134 but the primary purpose of these springs is only to provide a controlled amount of initial pressure of the sheave flanges against the belt and the springs are not strong enough to resist being compressed under heavy load conditions. To prevent excessive separation which would cause too great a reduction of speed of drive the cam faces of the crown-shaped flanges 141, 149, 150 and 146 come into action against the elastic pads 156. The elasticity of the pads allows only slight separation of the sheave flanges, and due to the said elasticity, and to the low friction coverings of the pads, the resistance of all of the cams to the separating movement is so uniform that the flanges, although free to position themselves, will not maintain contact with the pads unevenly and cause undue wear or binding at one point. The elasticity and resilience of the pads does, however, allow small radial movements which facilitates flow of lubricant to the interengaged surfaces of the mounting sleeve 77 and of the sheave hubs 99 and 100, to which surfaces the lubricant is conveyed through conduits 101, 102 and 104.

In the third embodiment of the invention, represented by Figs. 6, 7, 8 and 9, the center of belt pull is closer to the center of the motor shaft than in the two previously described embodiments. In this embodiment a sleeve 165 is mounted on shaft 166, and is locked against turning thereon by key 167 seated in keyway 169 in sleeve 165 and a corresponding keyway not shown in shaft 166, the key being secured against dislodgment by set screw 170. Shaft 166 extends only part way through sleeve 165, and the other end portion 171 of central bore 172 of the sleeve is sealed from the shaft portion by transversely extending diaphragm 174. The end of sleeve 165 opposite shaft 166 is sealed by end plate 175, thus providing a lubricant reservoir 176 in the sleeve, and end plate 175 is provided with an opening 177 for initial admission of fluid lubricant, the said opening being closed by pipe plug 178. End plate 175 may be secured on the end of sleeve 165 by cap screws one of which is indicated by numeral 179.

The outer surface of sleeve 165 is precisely and smoothly finished and a pair of sheave flanges 180, 181 are mounted thereon. Flange 181 is provided with an extended hub portion 182, mounted directly on the sleeve 165 and the other flange 180 has a shorter hub 183 mounted on the extended hub portion 182 of flange 181. Toward one end, hub portion 182 is provided with a groove 185 in which is seated a sealing ring 186. At its other end portion hub 182 is provided with a groove 187 containing a sealing ring 189 secured in place by O-ring 190. In a similar manner the shorter hub portion 183 is provided with an annular groove 191 near one end containing a sealing ring 192, and at its other end has a groove 194, containing a sealing ring 195 held in place by O-ring 196.

Toward the end of hub 182 remote from its flange 181, an abutment ring 197 is mounted and held against movement to the left, as viewed in Fig. 6 by a snap ring 199 seated in groove 200 in hub 182. Abutment ring 197 is provided on its inner face with an annular flange or ledge 201 serving as a rest for one end of a coil spring 202, the other end portion of which is seated in a groove 204 in flange 180 adjacent its hub portion 183. The spring 202 is of such length and strength as to press sheave flanges toward each other with comparatively light force to provide the initial pressure of the flanges against the V-belt with which they work. The space in which spring 202 is contained is closed to the outside by a pair of telescoping housing rings, 205, 206, one mounted on ring 197 and thus on the hub of flange 181, while the other 206, is mounted on a horizontal annular flange 207 on sheave flange 180.

For the purpose of limiting angular displacement of flanges 180, 181, relative to one another, and also for preventing an increase of separation of the flanges when under heavy load, and thus to maintain approximately constant speed, the hubs 182, 183, of the flanges 180, 181, are interconnected by a pair of transversely extending pins 209, 210, passing through the lubricant reservoir portion 176 of sleeve 165. The said pins are arranged at approximately right angles to each other, and are in the same transverse plane. In order to pass each other without interference each pin is provided with a cut away reduced portion 211, 212, respectively, of slightly less than half its diameter, and the cut away portions are at the adjacent sides of said pins.

Pin 209 passes through a pair of opposed openings 214, 215 in sleeve 165, which are of larger diameter than pin 209 and the free space therebetween is occupied by bushings 216, 217 of elastic material such as rubber held between inner and outer metallic sleeves 218, 219 respectively. The portions of pin 209 which extend outwardly beyond sleeve 165 may be somewhat reduced as indicated at 220 and 221, and on the outer ends of the reduced portions are mounted shoes 222 and 223, respectively, of elastic material. At the locations of said shoes the extending hub 183 of sheave flange 180 is provided with triangular shaped openings 224 and 225 respectively. The other pin 210 also extends through openings 226 and 227 in sleeve 165, which are of larger diameter than said pin and the spaces therebetween are occupied by bushings 229 and 230 respectively similar to bushings 216, 217. Outwardly, beyond sleeve 165 pin 210 is of reduced diameter and is provided with a pair of shoes 231, 232, of elastic material, the said shoes being accommodated in triangular openings 234 and 235 respectively in the extended hub 182.

The sides of the triangular openings serve as cam surfaces against which the shoes engage to provide axial pressure in proportion to the driving torque. The rubber bushings insure a uniform distribution of the torque to each shoe, and also provide the necessary radial freedom to permit free shift of the flange hubs without restraint and without wear.

For supplying lubricant from reservoir 176 sleeve 165 is provided with a radial bore 236 which has its outer end opening at a position inside flange hub 182 between the two sealing rings 186 and 189. It is unnecessary to provide special conduit means for supplying lubricant to the inside of hub 183, since the lubricant can flow thereto through openings 234 and 235 in hub 182.

The fourth embodiment of the invention is represented in Figs. 9, 10, and 11. In this embodiment numeral 240 indicates a driving or driven shaft which extends into the axial bore 241 of sheave sleeve 242. The sleeve is held against rotation relative to the shaft by means of a key 244 in keyway 245 in said sleeve and a keyway (not shown) in shaft 240 and the key is locked against dislodgment by set screw 246. Set screw 246 also extends through abutment ring 247 and holds it in place so as to guard against elements of the sheave sliding off the end of the sleeve. Shaft 240 extends only part way through the central axial bore 241 and beyond its end a diaphragm 249 extends across the bore and seals it. The end of the sleeve opposite the shaft 240 is closed by an end plate 250 secured to the sleeve end by cap screws one of which is shown, at 251, which provides a closed container or reservoir 252 for fluid lubricant. End plate 250 is provided with an opening 254 for initial charging of the reservoir with lubricant, the said opening being closed by pipe plug 255.

The outer surface of sleeve 242 is precisely and smoothly finished and has mounted thereon a pair of conical sheave flanges 256 and 257, having their convex faces toward each other. Sheave flange 257 is provided with a hub portion 259 which has considerable axial extent. The said extending hub portion 259 is smoothly finished on both its inner and outer surfaces, and the hub 260 of sheave flange 256 is slidably mounted on the outside of hub portion 259. The inner surface of hub 260 is also smoothly finished so that it is readily slidable on hub extension 259.

In order to provide the initial pressure of the sheave flanges against the V-belt with which they are to engage, in operation a coil spring 261 is provided encircling the hub portions 259 and 260. One end of spring 261 abuts against sheave flange 256 within a locating ring 262 formed on said flange, and the other end of said spring abuts against retaining collar 264, mounted on the free end of hub extension 259, and held against the spring pressure by snap ring 265 seated in groove 266 in the end portion of hub 259. A pair of telescopically, relatively movable covering rings 267 and 269, mounted on collar 264 and ring 262 respectively, serve as a shielding housing for spring 261.

As above stated spring 261 provides the initial pressure of the sheave flanges against the belt but it does not have sufficient stiffness to resist movement of the sheave flanges too far apart when operating under heavy load. Resistance to such movement is provided by the mechanism now to be described. A pair of pins 270, 271 extend transversely across sleeve 242 at right angles to each other and are located approximately in the same transverse plane. In order to pass each other without interference, these pins are cut away on opposite sides of their middle portions to slightly less than half round as indicated at 272 and 273. The end portions of pin 270 pass through openings 275, 276, respectively, in opposite sides of sleeve 242, and also through openings 277, 278, respectively, in opposite sides of extending hub 259, and, thence, into triangular shaped openings 280, 281, respectively in opposite sides of hub 260. These end portions are provided with triangular shoe members 282, and 283, respectively, which are positioned to engage against the angularly disposed walls 285, 286, respectively, of triangular openings 280, 281.

The end portions of the other transversely extending pin 271, pass through openings 289, 290, respectively, in opposite sides of sleeve 242, and on into triangularly shaped openings 291, 292, respectively, sheave hub 259. The end portions of pin 271, within openings 291 and 292, are provided with triangularly shaped shoes 294 and 295, respectively, adapted to cooperate with inclined walls 296, 297 of triangular openings 291, 292, respectively.

For the purpose of allowing slight radial movement of pins 270 and 271, to accommodate to any such movements of hubs 259 and 260 and thus prevent relative radial rubbing movements therebetween, and to restrain said pins and the hubs against which they bear from excessive axial movements, each of said pins 270 and 271 has a pair of leaf springs fixedly attached thereto in the vicinity of their end portions which springs are restrained against angular turning movements about the axis of sleeve 242 at their other ends. In Fig. 10 leaf spring 299 is shown secured at its right-hand end between two parts 300 and 301 of pin 270, by a bolt 302 which passes through an axial bore in part 300 and through a hole in spring 299 and into a screw-threaded bore 304 in part 301 of pin 270. The other end of spring 299 is silver soldered at 305 to a cross rod 306, which has its ends rotatably mounted in opposed openings 307, 308 in sleeve 242. Spring 303 is similarly connected to pin 270 and cross rod 306 toward their opposite end portions. A second cross rod 310 is also provided extending at right angles to rod 306, and has its ends rotatably mounted in opposed openings 311, 312, respectively, in sleeve 242. The pair of leaf springs connecting pin 271 with rod 310 are designated 314 and 315 respectively, in Fig. 11, their connections with the said pin and rod being similar to those above described in connection with springs 299 and 303 and pin 270 and rod 306. In order to pass each other without interference rods 306 and 310 are bent at their center parts out of alignment with their ends. To facilitate assembly of the said cross rods 306 and 310 their end portions may be made as separate parts and secured together by screws 316, for example, when being assembled.

In this embodiment, as in those previously described, the ends of the hub 259 are sealed against sleeve 242, and the end portions of hub 260 are sealed against hub 259 by sealing rings 317 and 318; and 319 and 320, respectively. For closing triangular openings 280 and 281 against leakage of lubricant a sealing cylinder 321 is provided, secured to hub 260 by bolts 322.

In operation the lubricant is supplied from the reservoir 252 to the engaging faces of sleeve 242 and hubs 259 and 260 through triangular openings 291 to keep the sheave adequately lubricated for its entire lifetime.

Small movements of the sheave flanges axially of each other are permitted by slight flexure of springs 299 and 303, and 314, 315, but such movements immediately begin to be opposed by engagement of the shoes, 282, 283, on cam surfaces 285, and 286, respectively, and shoes 294, and 295 on cam surfaces 296 and 297 respectively. The axial forces applied to the sheave flanges by the belt under heavier load are applied to springs 299 and 303, and 314 and 315 and these springs are therefore designed to be able to carry and resist such loads applied to said springs in compression.

In Figs. 12, 13 and 14 an embodiment is illustrated which provides a lubricated-for-life, fret-free construction for a low load, low cost sheave. In this embodiment the sheave has a sleeve 325 mounted on the end portion of a driving or driven shaft 326 on which it is held against relative rotation by 327 mounted in keyway 329 in said sleeve and in a keyway (not shown) in shaft 326. The key is locked in position by set screw 330 in sleeve 325. At an intermediate location beyond the end of shaft 326 the axial bore of sleeve 325 is closed by a transversely extending diaphragm 332, and the end of sleeve 325 opposite shaft 326 is closed by an end plate 334 secured to the sleeve by screws 335. The end plate 334 is provided with an opening 336 for the initial charging of the lubricant reservoir 337 with lubricant, and opening 336 is closed by pipe plug 339.

The outer surface of sleeve 325 is precisely and smoothly finished and a pair of sheave flanges 340, 341 are mounted thereon. These flanges are of the interrupted face design in order to be able to use standard V-belts but this design would not be basically different as far as the other features are concerned if smooth faced flanges were employed. It will be observed that flange 340 has a hub portion 342 which extends to the right as viewed in Fig. 12 and towards the ends of said hub on its inner face annular grooves 344 and 345 are formed in which are seated lubricant sealing rings 346 and 347 respectively.

The other sheave flange 341 also has a hub portion 349 which extends to the right as seen in Fig. 12, and this hub is also provided with grooves 350 and 351 near its ends for accommodating sealing rings 352 and 353, respectively.

For supplying lubricant to the outer surface of sleeve 325 beneath hub 342 a radial bore 355 is provided in the reservoir wall at a point between the sealing rings 346, 347 of said hub and the lubricant will be induced to flow from the reservoir through said radial bore under the influence of centrifugal force. To supply lubricant beneath hub 349 a set of interconnected bores are formed in sleeve 325 comprising radial bore 356 extending from the reservoir 337, radial bore 357 opening outwardly beneath hub 349 and axial bore 359 connecting the outer end of bore 356 with the inner end of bore 357. The left hand end of bore 359 is closed by plug 360. Since the outer end of bore 357 is farther removed from the axis of rotation than is the inner end of bore 356, the lubricant will flow to the outside of the sleeve under the influence of centrifugal force.

The end plate 334 extends outwardly beyond sleeve 325 and at its outer edge has an extension or flange 361 directed axially toward the sheave flange 340, so that the end plate is generally cup-shaped. On its inner surface flange 361 is provided with an abutment lug 362, against which one end of a stiff coil spring 364 bears in compression. The other end of spring 364 bears against sheave flange 340 and is supported in position by an annular shelf 365 formed at the base of flange 340.

At the end of sleeve 325 into which shaft 326 extends an end plate 366 is mounted on the outside of sleeve 325. End plate 366 extends radially outward and at its outer edge is provided with an extension or flange 367 extending axially toward sheave flange 341. Inside flange 367 a stiff compression coil spring 369 is provided abutting end plate 366 at one end and sheave flange 341 at its other end. The ends of the spring are supported by annular shelves 370 and 371 formed on end plate 366 and sheave flange 341, respectively. The stiffness of springs 364 and 369 is sufficient to allow only very small separation of sheave flanges when operating under the maximum load this particular sheave is intended to carry.

For elastically drivingly connecting the sheave flanges 340 and 341 with the sleeve 325 and, thus, with shaft 326, the outer faces of flanges 361 and 367 are provided with a series of axially extending splines 372, separated by axial grooves 374. On the outer faces of sheave flanges 340 and 341 are formed axially extending cylindrical flanges 375 and 376, respectively, which overlap flanges 361, and 367, respectively. Flanges 375 and 376 are provided on their inner faces with sets of inwardly extending axial splines 377 separated by axial grooves 379. When assembled the pairs of flanges 361, 375, and 367 are arranged with their splines in the grooves of the respective overlapping flange, and the grooves are made wider than the splines of the complementary flanges, leaving spaces in which are disposed bars of elastic material 380. This elastic material, such as rubber, allows a small amount of relative angular movement between the two sheave flanges which facilitates feed of lubricant between the sleeve 325 and the hubs 342 and 349. This relative movement is permitted by a small amount of play being provided between the intermeshing portions of sheave flanges 340 and 341 as indicated at 381 in Fig. 14.

The desirable slight movements of the flange hubs 342, and 349 relative to the sleeve 325 is permitted by the inherent flexibility of flanges 361, 375, and 367, 376.

Another desirable feature for facilitating slight movements between the sheave flanges and sleeve 325 is the interposition of a coating of nylon 382 between the interfaces of the splines, 372, 377 and grooves 374, 379. This coating can be provided by lining the grooves with sheet nylon, or nylon fabric, or one set of splines and grooves can be dipped in nylon.

The embodiment represented in Fig. 15 is another example of a low cost motion control sheave adapted for low power transmission. In this embodiment a sleeve 385 is mounted on shaft 386 and is fixedly secured thereon by key 387 seated in keyway 389 in said sleeve and a keyway, not shown, in shaft 386, and said sleeve is locked on the shaft by set screw 390 which engages against key 387.

Shaft 386 extends only part of the length of sleeve 385, and beyond the end of said shaft the bore of the sleeve is closed by a transversely extending diaphragm 391. The opposite end of sleeve 385 is closed by plate 392 secured by cap screws 394, and said plate is provided with an opening 395 through which a supply of lubricant can be charged into reservoir 396 formed in sleeve 385 between the diaphragm 391 and end plate 392.

Toward one end the sleeve 385 is formed with a conical flange 397 of the interrupted face type resembling that of the embodiment represented by Figs. 12–14. The sleeve extends a considerable distance to the right beyond flange 397 and its outer surface is precisely and smoothly finished. On this portion of the sleeve is mounted a mating second flange 399 of the interrupted face type. The inner surface of the hub portion 400 of flange 399 is precisely and smoothly finished and is slidable and rotatable relative to the sleeve on which it is mounted. The inner surface of hub 400 is provided near each of its ends with a recess 401, 402, respectively, in which are seated sealing rings 404, 405, respectively. In order to provide access of lubricant to the outer surface of sleeve 385 beneath hub 400 between sealing rings 404, 405 the sleeve is provided with a radial bore 406 through which the lubricant is induced to flow by centrifugal force in operation. Bore 395 is closed by pipe plug 398.

In operation the two flanges 397 and 399 must be pressed against the belt with which they work and to provide this pressure a compression coil spring 407 is provided which encircles the hub portion 400 of flange 399, and sleeve 385, and bears with one end against flange 399 around a ledge 409. The other end of spring 407 bears against an outwardly extending portion 410 of plate 392 outside of annular ridge 413 formed on the inner face of plate 392.

For the purpose of driving flange 399 from sleeve 385, end plate portion 410 is provided at its outer edge with a cylinder-like flange 411 extending axially toward sheave flange 399. The flange 399 is also provided with a cylinder-like flange 412 extending to the right, as viewed in Fig. 15, which telescopically overlaps flange 411. The outer face of flange 411 and the inner face of flange 412 are formed with splines 413, 414 and grooves similar to those represented in Figs. 12 and 13, on flanges 361 and 375. Also, as in Figs. 12 and 13, the grooves are wider than the splines and the vacant spaces therebetween are occupied by bar-like pads 415 of elastic material such as rubber. By this drive connection a certain amount of separation of sheave flanges is made possible under increase of load but the spring 407 is stiff enough to avoid undesired separation. In this embodiment also the interfaces between flanges 411 and 412 are preferably lined with a substance of low friction such as sheet nylon, nylon fabric or one flange can be coated by dipping in nylon.

Since the radial movement of the flange 399 relative to sleeve 385, which is so desirable for facilitating lubrication, is small, being at the most only a few thousandths of an inch, the radial freedom is provided by the flexibility inherent in the end portions of flanges 411 and 412. Thus the small amount of necessary radial movement of the sliding flange can occur with radial restraint from the spring guard, and without fretting corrosion taking place, because the flexibility of the end members will permit the movement to take place without sliding at the points of connection of the cylindrical flanges to the hub and end plate respectively.

I claim:

1. A motion control sheave comprising a cylindrical sleeve, a pair of conically faced flanges operatively carried by said sleeve approximately coaxially therewith, one of said flanges having a hub portion and being axially slidable relative to said sleeve, substantially pure torque means torsionally resisting movements of said one flange relative to said sleeve, said means being radially resilient, in all positions of rotation whereby said flange is free to shift radially so that the zone of contact between the hub portion of said one flange and said sleeve is always free to precess around said sleeve as the position of said flange changes with respect to the direction of belt pull, the hub portion of said one flange being provided with fluid lubricant seals toward its ends, said sleeve having a fluid lubricant reservoir, and conduit means connecting said reservoir with the outside of said sleeve between said seals.

2. A motion control sheave according to claim 1, and in which the other of said sheave flanges is operatively mounted on said sleeve by an axially extending hub portion.

3. A motion control sheave according to claim 2, and in which said flanges are provided with connecting means extending therebetween to resist relative angular movements between said sheaves.

4. A motion control sheave according to claim 3, and in which said flange connecting means is elastic so as to allow slight relative movements between said flanges without jamming.

5. A motion control sheave according to claim 1, and in which said substantially pure torque means comprises a torsional spring having one end drivingly connected to said sleeve, and the other end drivingly connected to said one flange.

6. A motion control sheave according to claim 2, and in which said other flange is also provided with substantially pure torque means for torsionally resisting movements of said other flange relative to said sleeve, a pair of coil springs each engaging one of said flanges, said sleeve being provided with a pair of abutments against which the other ends of said springs engage, respectively, to press said sheave flanges against the belt with which said flanges work, said means for torsionally resisting relative movements of said flanges relative to said sleeve comprising an axially extending flange on each sheave flange, a set of axially extending splines and intermediate grooves formed on each said axially extending flange, a pair of axially extending flanges carried by said sleeve extending toward and overlapping the axially extending flanges of said sheaves flanges respectively, each of said extending flanges of said sleeve being provided with axially extending splines and grooves interengaging with the grooves and splines of said axially extending flanges of said sheave flanges, respectively, said grooves being wider than said splines and bodies of elastic material interposed between said splines in said grooves to provide elastic drive between said sleeve and said sheave flanges.

7. A motion control sheave, according to claim 6, and in which said splines are arranged in slightly spaced relation to the bottoms of the respective grooves in which they are disposed, and a layer of nylon is disposed between said splines and the bottoms of said grooves.

8. A motion control sheave, according to claim 7, and in which said layer is a coating applied to one of the members between which it is disposed.

9. A motion control sheave according to claim 1 and in which said substantially pure torque means comprises inclined faces on said sleeve and said one flange facing each other and elastic pads mounted between said faces to be engaged thereby to provide progressively increasing resistance to movements of said one flange away from the other flange and also progressively increasing resistance movements of said one flange angularly about said sleeve upon increase of load.

10. A motion control sheave according to claim 9, and in which said elastic pads are composed of rubber.

11. A motion control sheave according to claim 10, and in which said elastic pads are provided with a covering of low-friction material on the faces thereof which engages on said inclined faces.

12. A motion control sheave according to claim 1, and in which the other of said flanges is also provided with an axially extending hub portion.

13. A motion control sheave according to claim 12, and in which substantially pure torque means is provided for torsionally resisting movements of said other flange relative to said sleeve.

14. A motion control sheave according to claim 12, and in which the hub portion of one of said sheave flanges is slidably, and rotatably mounted on the hub portion of the other of said flanges, both of said substantially pure torque means comprising a pair of pins extending transversely of said sleeve approximately at right angles to each other, said sleeve being provided with openings for passage of said pins through its walls, elastic means in said openings for securing said pins to said sleeve to allow said pins to move slightly relative thereto, the outer end portions of said pins being provided with shoes, the extending hub portions of said flanges being provided with pairs of opposed openings having edges inclined peripherally of said hubs, the shoes of one of said pins engaging the inclined walls of one of said openings of one of said hubs, and the shoes of said other pin engaging against the walls of the openings in the other of said other hubs.

15. A motion control sheave, according to claim 1, and in which one of said flanges is fixed with respect to said sleeve, a compression coil spring having one end engaging the other of said flanges and its other end engaging against abutment means mounted on said sleeve in spaced relation to said other flange to apply lateral pressure to said flanges and against the belt with which they work, said other flange being provided with a set of splines and grooves extending axially, said abutment means being provided with a corresponding set of splines and grooves extending axially and meshing with the set on said other flange, said grooves being wider than said splines so as to leave spaces between the adjacent walls of said splines, and elastic bodies disposed in said spaces said splines and elastic bodies constituting said means for resisting relative movement of said other flange relative to said sleeve.

16. A motion control sheave according to claim 15, and in which said sets of splines and grooves are formed in cylinder-like flanges provided on said other sheave flange and said abutment means respectively, and said cylinder-like flanges have sufficient flexibility to allow said other flange to perform slight radial movements with respect to said sleeve in operation.

17. A motion control spring actuated sheave comprising a sleeve having a pair of conically faced sheave flanges having hubs operatively mounted on said sleeve, the conical faces of said flanges facing each other to provide a V-shaped annular groove therebetween, for accommodating V-belt with which the sheave works, spring means pressing both said flanges toward each other to provide pressure against the belt, radially resilient means for preventing rotation of both flanges with respect to said sleeves, said sleeve embodying an oil reservoir connected by conduit means to the outside of said sleeve beneath said hubs, and sealing means at the ends of said hubs to prevent leakage from between said hubs and said sleeve.

18. A motion control spring actuated sheave comprising a sleeve having a pair of conical sheave flanges operatively mounted thereon, facing each other to provide a V-shaped annular groove therebetween, one flange being fixed to said sleeve, the other flange being slidably operatively mounted on said sleeve by means of a hub and provided with spring means pressing it toward said fixed flange, and radially resilient means for preventing rotation of said slidable flange with respect to said sleeve, said sleeve embodying an oil reservoir conduit means connecting said reservoir to the clearance space between said flange hub and said sleeve, and sealing means at the ends of said slidable hub to prevent leakage of oil from space between hub and sleeve.

References Cited in the file of this patent

UNITED STATES PATENTS

| | | |
|---|---|---|
| 2,283,392 | Shadrick | May 19, 1942 |
| 2,475,800 | Munroe | July 12, 1949 |
| 2,607,235 | Ruegenberg | Aug. 19, 1952 |
| 2,611,277 | Mitchell | Sept. 23, 1952 |
| 2,699,071 | Miner | Jan. 11, 1955 |
| 2,746,816 | Michie | May 22, 1956 |